US012631920B2

(12) United States Patent
Wu et al.

(10) Patent No.: US 12,631,920 B2
(45) Date of Patent: May 19, 2026

(54) DISPLAY PANEL AND DISPLAY APPARATUS

(71) Applicant: Xiamen Tianma Optoelectronics Co., Ltd., Xiamen (CN)

(72) Inventors: Guangya Wu, Xiamen (CN); Xuhui Peng, Xiamen (CN); Zongcai Ding, Xiamen (CN); Xiaohe Li, Xiamen (CN); Jiayin Tang, Xiamen (CN); Qiongqin Mao, Xiamen (CN)

(73) Assignee: Xiamen Tianma Optoelectronics Co., Ltd, Xiamen (CN)

( * ) Notice: Subject to any disclaimer, the term of this patent is extended or adjusted under 35 U.S.C. 154(b) by 0 days.

(21) Appl. No.: 18/830,567

(22) Filed: Sep. 10, 2024

(65) Prior Publication Data

US 2025/0004334 A1 Jan. 2, 2025

(30) Foreign Application Priority Data

Apr. 2, 2024 (CN) .......................... 202410396434.1

(51) Int. Cl.
*G02F 1/1343* (2006.01)
*G02F 1/1333* (2006.01)
*G06F 3/041* (2006.01)

(52) U.S. Cl.
CPC .... *G02F 1/134345* (2021.01); *G02F 1/13338* (2013.01); *G06F 3/0412* (2013.01); *G06F 3/04164* (2019.05); *G06F 2203/04111* (2013.01)

(58) Field of Classification Search
CPC ............... G06F 3/04164; G06F 3/0412; G06F 2203/04111
See application file for complete search history.

(56) References Cited

U.S. PATENT DOCUMENTS

2021/0247869 A1* 8/2021 Kim .................... G06F 3/04164
2024/0045540 A1* 2/2024 Rhe ..................... G06F 3/04164

FOREIGN PATENT DOCUMENTS

CN 109979882 A 7/2019

* cited by examiner

*Primary Examiner* — Peter D McLoone
(74) *Attorney, Agent, or Firm* — Wiersch Law Group

(57) ABSTRACT

The present disclosure provides a display panel, including a substrate, and touch lines and touch electrodes located at one side of the substrate. One touch electrode is electrically connected to at least one touch line; each touch electrode includes at least one hollow extending along a first direction; each touch electrode is isolated by the at least one hollow in a second direction; the second direction intersects with the first direction; each touch electrode includes electrode portions respectively located at two sides of the hollow; in a region of the touch electrode, at least a part of a first touch line is in contact and electrical connection with the touch electrode; along a direction perpendicular to a plane of the substrate, a second touch line overlaps with one hollow; and electrode portions at least located at two sides of the second touch line are electrically connected through a bridging portion.

20 Claims, 19 Drawing Sheets

DISPLAY PANEL AND DISPLAY APPARATUS

CROSS-REFERENCE TO RELATED APPLICATIONS

The present application claims priority to Chinese Application No. CN 202410396434.1, filed on Apr. 2, 2024, the content of which is incorporated herein by reference in its entirety.

TECHNICAL FIELD

The present disclosure relates to the field of display technologies, and in particular to a display panel and a display apparatus.

BACKGROUND

According to the relevant technologies, a common electrode is patterned and divided into regions. Each region serves as a touch electrode to realize a touch function. Concerning a solution in which the common electrode is multiplexed as the touch electrode, when a display panel is manufactured, multiple masks are required to be used, resulting in a high manufacturing cost.

SUMMARY

Embodiments of the present disclosure provide a display panel and a display apparatus, to reduce the use of masks and lower a cost.

According to a first aspect, an embodiment of the present disclosure provides a display panel. The display panel includes a substrate, and a plurality of touch lines and a plurality of touch electrodes located at one side of the substrate. One touch electrode of the plurality of touch electrodes is electrically connected to at least one touch line of the plurality of touch lines.

Each touch electrode includes at least one hollow extending along a first direction. Each touch electrode is isolated by the at least one hollow in a second direction. The second direction intersects with the first direction. Each touch electrode includes electrode portions respectively located at two sides of the hollow. Two adjacent electrode portions are electrically connected through a bridging portion.

The touch lines include a first touch line and a second touch line.

In a region of one touch electrode, at least a part of the first touch line is in contact and electrical connection with the one touch electrode. Along a direction perpendicular to a plane of the substrate, the second touch line overlaps with one hollow.

According to a second aspect, based on a same inventive conception, an embodiment of the present disclosure further provides a display apparatus, including the display panel provided in any embodiment of the present disclosure.

BRIEF DESCRIPTION OF DRAWINGS

To describe the technical solutions in the embodiments of the present disclosure or in the related art more clearly, the following briefly describes the accompanying drawings required for describing the embodiments or the related art. Apparently, the accompanying drawings in the following description show some embodiments of the present disclosure, and those skilled in the art may still derive other drawings from these accompanying drawings without creative efforts.

DESCRIPTION OF EMBODIMENTS

In order to make the objectives, technical solutions, and advantages of the embodiments of the present disclosure clearer, the technical solutions in the embodiments of the present disclosure will be clearly and completely described below in conjunction with the accompanying drawings in the embodiments of the present disclosure. Apparently, the described embodiments are some, rather than all of the embodiments of the present disclosure. All other embodiments obtained by those of ordinary skill in the art based on the embodiments of the present disclosure without creative efforts should fall within the protection scope of the present disclosure.

Terms used in the embodiments of the present disclosure are only for the purpose of describing specific embodiments, and are not intended to limit the present disclosure. Unless otherwise specified in the context, expressions such as "a", "the", and "this" in a singular form in the embodiments of the present disclosure and the appended claims include a plural form.

Figure 1:
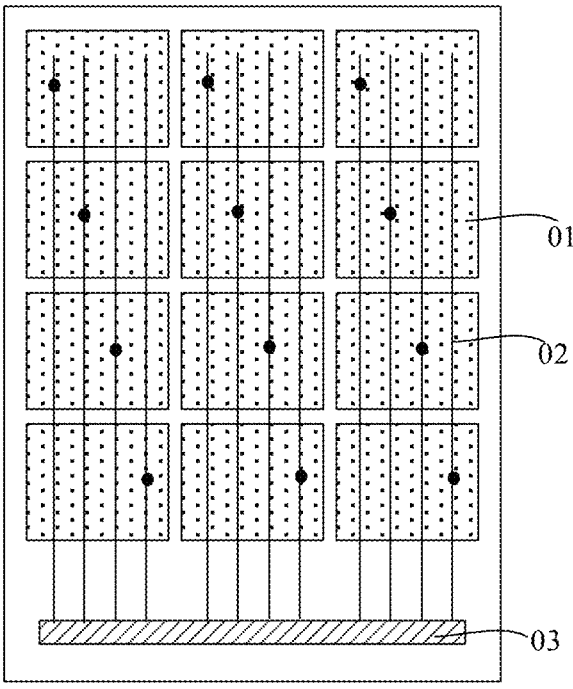
FIG. 1 is a schematic view of a display panel according to a related art.

FIG. 1 is a schematic view of a display panel according to relevant technologies. As shown in FIG. 1, a plurality of touch electrodes 01 are arranged in the display panel. A touch signal line 02 is electrically connected to the touch electrode 01. The touch signal line 02 is connected to a driver chip 03. The touch electrode 01 cooperates with the touch signal line 02 to realize a touch function. In display, a voltage difference between the touch electrode 01 and a pixel electrode forms an electric field, thereby controlling deflection of liquid crystal (LC) molecules. The touch electrode 01 is used as a common electrode. In other words, the common electrode on a whole surface is patterned into the plurality of touch electrodes 01.

Figure 2:
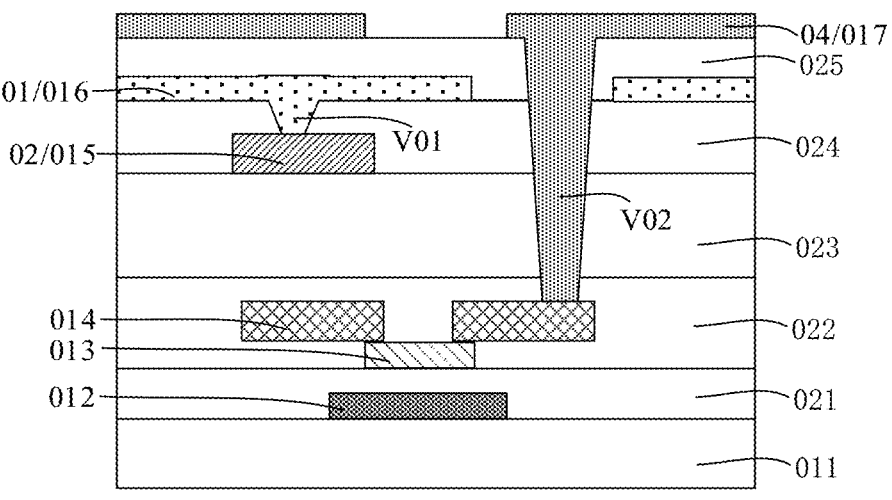
FIG. 2 is a schematic structural view of a film layer of a display panel according to a related art.

FIG. 2 is a schematic structural view of a film layer of a display panel according to relevant technologies. As shown in FIG. 2, a gate metal layer 012, a semiconductor layer 013, a source-drain metal layer 014, a third metal layer 015, a first transparent conductive layer 016, and a second transparent conductive layer 017 are arranged on a substrate 011. A gate of a switching transistor in the display panel is located on the gate metal layer 012, an active layer of the switching transistor is located on the semiconductor layer 013, a source and a drain of the switching transistor is located on the source-drain metal layer 014, a touch signal line 02 is located on the third metal layer 015, a common electrode (namely the touch electrode 01) is located on the first transparent conductive layer 016, and a pixel electrode 04 is located on the second transparent conductive layer 017. In manufacture, a first mask is used to manufacture the gate metal layer 012 on the substrate 011, and then a first insulating layer 021 is manufactured. A second mask is used to manufacture the semiconductor layer 013 on the first insulating layer 021. A third mask is used to manufacture the source-drain metal layer 014, and then a second insulating layer 022 is manufactured. A third insulating layer 023 is manufactured on the second insulating layer 022. The third insulating layer 023 is a planarization layer. A fourth mask is used to drill the third insulating layer 023 and the second insulating layer 022 to form a first sub-hole (not shown in FIG. 2). The first sub-hole exposes the drain of the switching transistor in the source-drain metal layer 014. A fifth mask is used to manufacture the third metal layer 015 on the third insulating layer 023. A fourth insulating layer 024 is manufactured on the third metal layer 015. A sixth mask is used to etch the fourth insulating layer 024 to form a via hole V01 and a second sub-hole (not shown in FIG. 2). The via hole V01 exposes the touch signal line 02 in the third metal layer 015. The second sub-hole corresponds to the first sub-hole. A seventh mask is used to manufacture the first transparent conductive layer 016 to form the plurality of touch electrodes 01. The touch electrode 01 is electrically connected to the touch signal line 02 through the via hole V01. A fifth insulating layer 025 is manufactured on the first transparent conductive layer 016. An eighth mask is used to drill the fifth insulating layer 025 to form a third sub-hole (not shown in FIG. 2). The third sub-hole corresponds to the second sub-hole and the first sub-hole to form a via hole V02 for exposing the drain of the switching transistor in the source-drain metal layer 014. A ninth mask is used to manufacture the second transparent conductive layer 017. The pixel electrode 04 in the second transparent conductive layer 017 is electrically connected to the drain of the switching transistor through the via hole V02. Hence, nine masks are used in the manufacture to cause a high manufacturing cost.

In order to lower the manufacturing cost, improvements are made to a structure of the display panel, and the original design with the touch electrode connected to the touch signal through the via hole is changed into a manner in which the touch electrode comes in direct contact and connection with the touch signal line. This can omit the drilling process of the insulating layer between the touch signal line and the touch electrode, reduce the use of the masks, and can lower the manufacturing cost.

An embodiment of the present disclosure provides a display panel. The display panel includes an array base plate and a counter base plate that are opposite to each other. An LC molecular layer is provided between the array base plate and the counter base plate. The array base plate includes a substrate, and a structure such as a pixel circuit, a pixel electrode, and a common electrode on the substrate. The counter base plate includes a black matrix (BM) and a color film. The color film includes a red color filter, a green color filter, and a blue color filter. The BM divides the counter base plate into a plurality of sub-pixels. The sub-pixels each include one color filter. Optionally, the color film may also include a white color filter.

Figure 3:
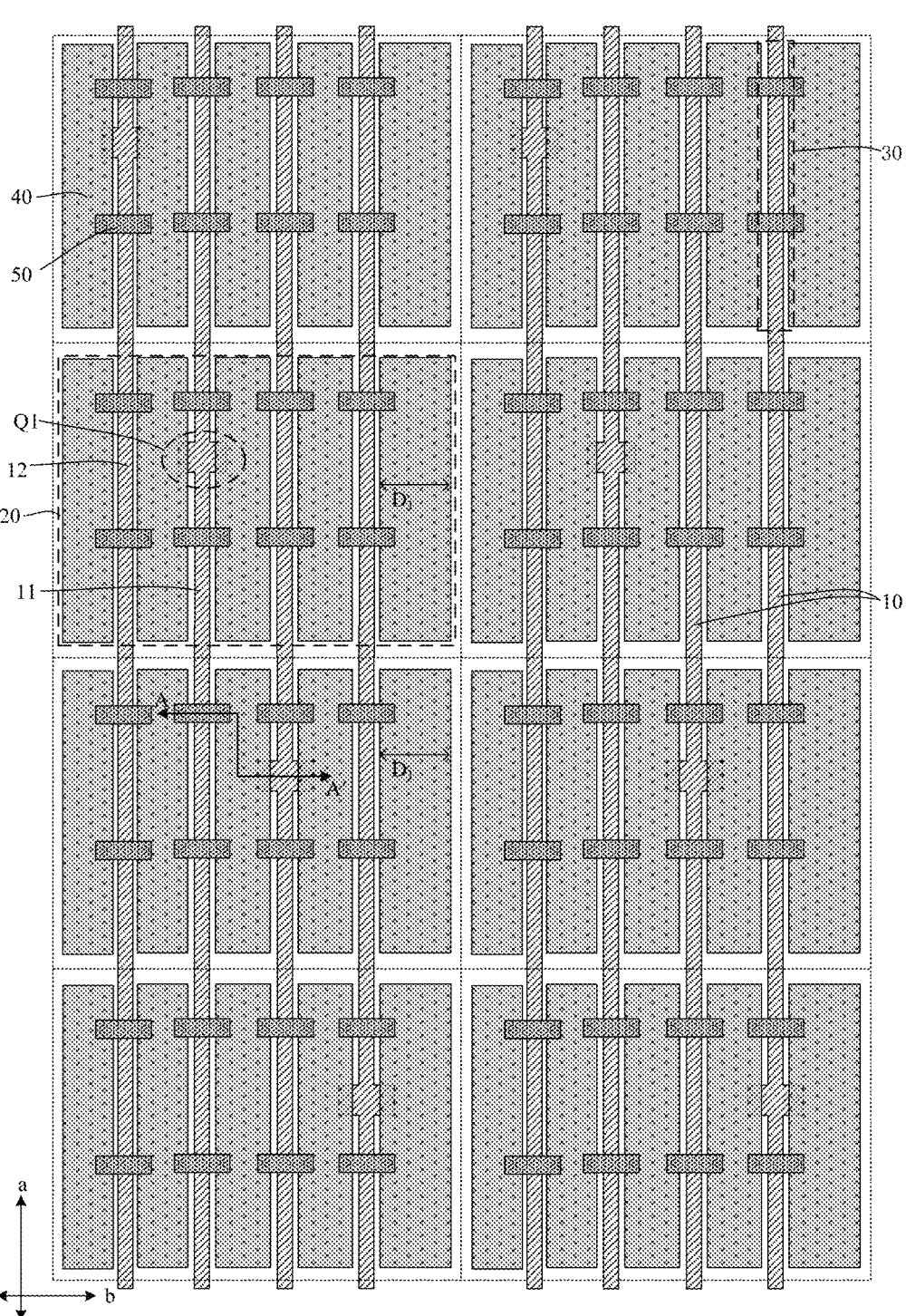
FIG. 3 is a partial schematic view of a display panel according to an embodiment of the present disclosure.

FIG. 3 is a partial schematic view of a display panel according to an embodiment of the present disclosure. As shown in FIG. 3, the display panel includes a plurality of touch lines 10 and a plurality of touch electrodes 20. The plurality of touch lines 10 and the plurality of touch electrodes 20 are located at a same side of the substrate (not shown in FIG. 3). One touch electrode 20 is electrically connected to at least one touch line 10. FIG. 3 schematically illustrates eight touch electrodes 20 at four rows and two columns. The shape of the touch electrode 20 in FIG. 3 is shown for the purpose of illustration only. It can be understood that in a solution in which the touch electrode 20 can be multiplexed as the common electrode, the pixel electrode needs to pass through a film layer of the touch electrode 20 and connected to the switching transistor under the touch electrode 20. Hence, a hollow region is formed in the touch electrode 20 to allow a via hole between the pixel electrode and the switching transistor to pass through. This part will be described in the following related embodiments.

The touch electrode 20 includes at least one hollow 30 extending along a first direction a. The touch electrode 20 is isolated by the at least one hollow 30 in a second direction b. The second direction b intersects with the first direction a. Optionally, the second direction b is perpendicular to the first direction a. The touch electrode 20 includes electrode portions 40 respectively located at two sides of the hollow 30. Two adjacent electrode portions 40 are electrically connected through a bridging portion 50. That is, the original lumped electrode is divided into at least two electrode portions 40 by the hollow 30. Two adjacent electrode portions 40 are electrically connected through the bridging portion 50, such that the whole touch electrode 20 has a same electrical signal. FIG. 3 schematically illustrates that one touch electrode 20 includes four hollows 30, and the touch electrode 20 is divided into five electrode portions 40.

The touch lines 10 include a first touch line 11 and a second touch line 12.

In a region of the touch electrode 20, at least a part of the first touch line 11 is in contact and electrical connection with the touch electrode 20. Along a direction perpendicular to a plane of the substrate (namely a direction perpendicular to paper in FIG. 3), the second touch line 12 overlaps with the hollow 30, and does not overlap with the electrode portion 40. That is, in the region of the touch electrode 20, the touch line 10 electrically connected to the touch electrode is named as the first touch line 11, and the touch line 10 not electrically connected to the touch electrode is named as the second touch line 12. The expression "come in contact and electrical connection" in the embodiment of the present disclosure refers to the first touch line 11 and the touch electrode 20 come in direct contact and are not connected through a via hole penetrating through an insulating layer.

In the region of the touch electrode 20, at least adjacent electrode portions 40 at two sides of the second touch line 12 are electrically connected through the bridging portion 50. FIG. 3 schematically illustrates that electrode portions 40 at two sides of the first touch line 11 are also electrically connected through the bridging portion 50, and the first touch line 11 is in contact and connection with the electrode portions 40 at the two sides of the first touch line. In this case, through the first touch line 11, the two electrode portions 40 at the two sides of the first touch line can also be electrically connected.

Figure 4:
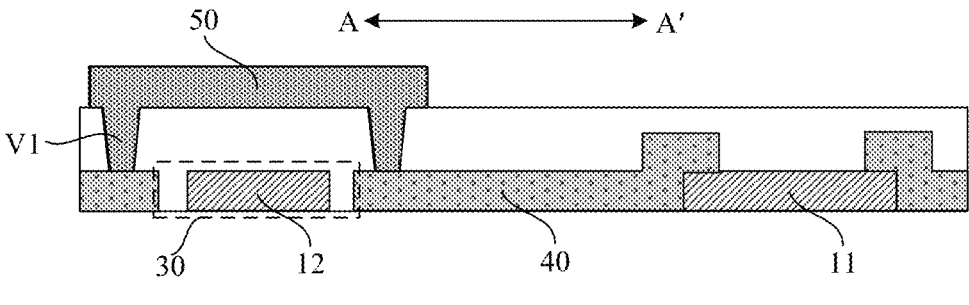
FIG. 4 is a schematic sectional view along a line A-A' shown in FIG. 3.

FIG. 4 is a schematic sectional view along a line A-A' shown in FIG. 3. As can be seen from FIG. 4, the first touch line 11 comes in direct contact and connection with the electrode portion 40, the bridging portion 50 is connected to the electrode portion 40 through a first via hole V1, and adjacent electrode portions 40 are electrically connected through the bridging portion 50.

Figure 5:
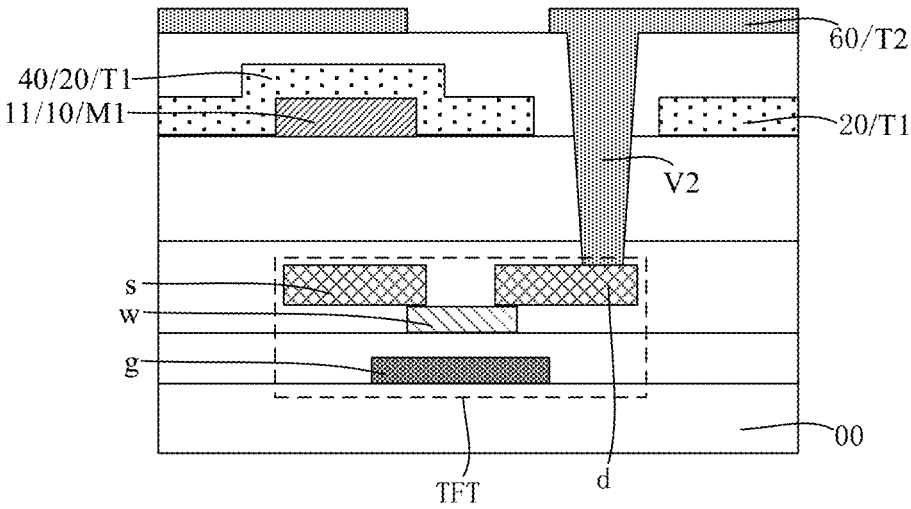
FIG. 5 is a schematic structural view of a film layer of a display panel according to an embodiment of the present disclosure.

FIG. 5 is a schematic structural view of a film layer of a display panel according to an embodiment of the present disclosure. As shown in FIG. 5, a switching transistor, Thin Film Transistor (TFT), is provided on the substrate 00. The switching transistor TFT includes an active layer w, a gate g, a source s, and a drain d. The touch electrode 20, the touch line 10 and the pixel electrode 60 are located at a side of the switching transistor TFT away from the substrate 00. The pixel electrode 60 is electrically connected to the drain d of the switching transistor TFT through a second via hole V2. As can be seen, there is no insulating layer between the film layer of the touch line 10 and the film layer of the touch electrode 20, and the first touch line 11 comes in direct contact and connection with the touch electrode 20. The switching transistor TFT in FIG. 5 takes a bottom-gate structure for illustration. In some other implementations, the switching transistor TFT is a top-gate structure. That is, the film layer of the gate g is located between the active layer w and the film layer of the source s.

According to the display panel provided by the embodiment of the present disclosure, the first touch line 11 is in contact and connection with the touch electrode 20. The hollow 30 on the touch electrode 20 divides the touch electrode 20 into the electrode portions 40. Two adjacent electrode portions 40 are electrically connected through the bridging portion 50, the second touch line 12 without being connected electrically with the touch electrode 20 is overlapping with the hollow 30. In this way, the whole touch electrode 20 has a same electrical signal, and the touch electrode 20 is in contact and electrical connected to the corresponding touch line 10. Since the first touch line 11 is in contact and connected to the touch electrode 20, an insulating layer is unnecessary between the film layer of the touch line 10 and the film layer of the touch electrode 20. The present disclosure omits a drilling process of the insulating layer between the touch line 10 and the touch electrodes 20, reduces the use of masks, and can lower a manufacturing cost.

In some implementations, as shown in FIG. 5, the display panel includes a first metal layer M1 and a first transparent conductive layer T1 that are located at one side of the substrate 00. The first transparent conductive layer T1 is located at a side of the first metal layer M1 away from the substrate 00. The touch line 10 is located on the first metal layer M1. The touch electrode 20 is located on the first transparent conductive layer T1. That is, the first touch line 11 is located at a side of the touch electrode 20 close to the substrate 00. A material of the first metal layer M1 may include titanium and aluminum. For example, the first metal layer M1 is a titanium/aluminum/titanium three-layer structure. A material of the first transparent conductive layer T1 includes indium tin oxide. That is, in the manufacture of the display panel, the switching transistor TFT is manufactured on the substrate 00 first, and then the first metal layer M1 and the first transparent conductive layer T1 are manufactured sequentially.

As shown in FIG. 5, the display panel includes a second transparent conductive layer T2. The second transparent conductive layer T2 is located at a side of the first transparent conductive layer T1 away from the substrate 00. The pixel electrode 60 in the sub-pixel is located on the second transparent conductive layer T2. The second transparent conductive layer T2 and the first transparent conductive layer T1 may be made of a same material. The touch electrode 20 is located on the first transparent conductive layer T1. The pixel electrode 60 is located on the second transparent conductive layer T2. The touch electrode 20 overlaps with the pixel electrode 60. When the display panel is controlled to display, the touch electrode 20 is used as the common electrode. A common voltage is provided for the touch electrode 20, and a data voltage is written into the pixel electrode 60. An electric field formed by a voltage difference between the touch electrode and the pixel electrode can control deflection of LC molecules, thereby adjusting an LC transmittance and realizing light emission of the sub-pixel.

In some embodiments of the present disclosure, the bridging portion 50 and the pixel electrode 60 are located on a same layer. The bridging portion 50 can be manufactured in a same process with the pixel electrode 60. This does not increase the use of the masks, and can simplify the manufacturing process. Meanwhile, the bridging portion 50 is made of a transparent conductive material, so as to achieve a high transmittance, without affecting the light emission of the sub-pixel.

In some other implementations, the first touch line 11 is located at a side of the touch electrode 20 away from the substrate 00, which is not illustrated herein. That is, in the manufacture of the display panel, the touch electrode 20 with the hollow 30 is manufactured first, and then the touch line 10 is manufactured. In the region of the touch electrode 20, the first touch line 11 comes in direct contact and connection with the touch electrode 20, and the second touch line 12 overlaps with the hollow 30.

Figure 6A:
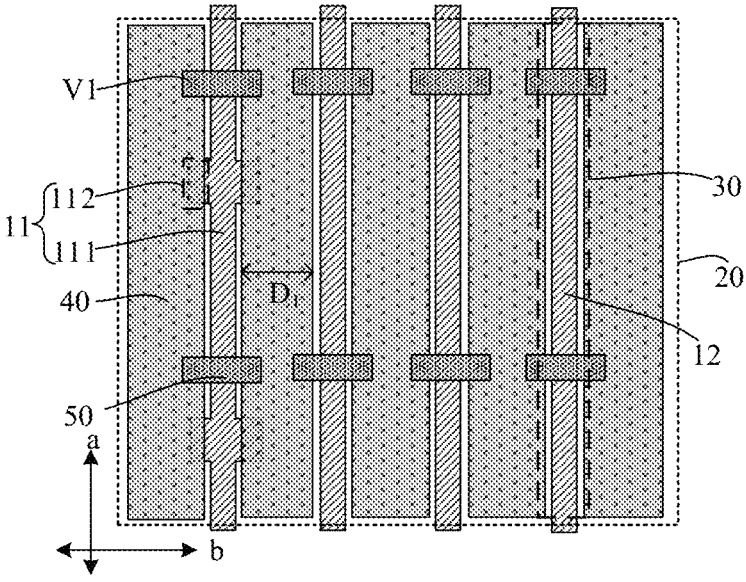
FIG. 6A is a partial schematic view of another display panel according to an embodiment of the present disclosure.

In some implementations, FIG. 6A is a partial schematic view of another display panel according to an embodiment of the present disclosure. As shown in FIG. 6A, the first touch line 11 includes a trace portion 111 and at least one protrusion 112. The trace portion 111 extends along the first direction a. The protrusion 112 is connected to the trace portion 111, and protrudes along the second direction b. Along the direction perpendicular to the plane of the substrate 00 (namely an overlooking direction of a top view of FIG. 6A), the trace portion 111 overlaps with the hollow 30. At least a part of the protrusion 112 overlaps and contacts with the electrode portion 40. In the implementation, in the region of the touch electrode 20, the trace portion 111 of the first touch line 11 also overlaps with the hollow 30. That is, the touch electrode 20 is provided thereon with the hollow 30 for the touch line 10 electrically connected to the touch electrode and the touch line 10 not electrically connected to the touch electrode. When the touch lines 10 are arranged regularly along the second direction b, this implementation makes each touch electrode 20 keep an approximately same pattern, and makes the touch electrode 20 etched more uniformly, thereby ensuring uniform electrical performance of each touch electrode 20.

Figure 6B:
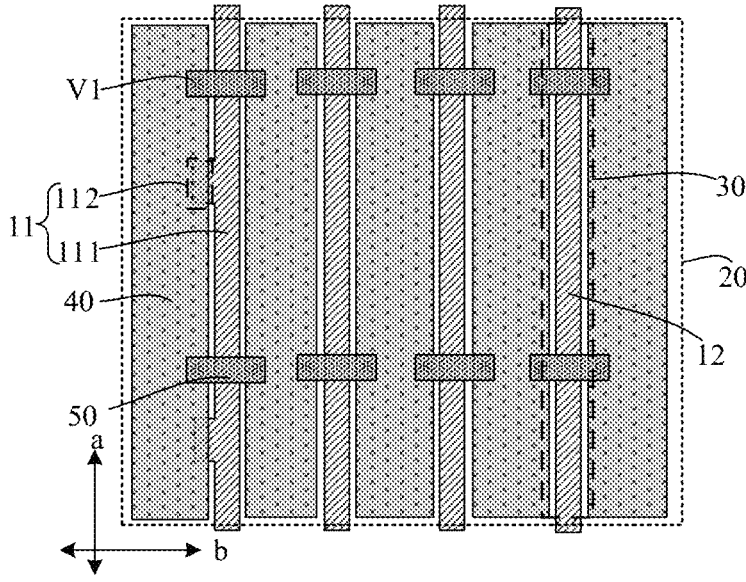
FIG. 6B is a partial schematic view of another display panel according to an embodiment of the present disclosure.

In some other implementations, FIG. 6B is a partial schematic view of another display panel according to an embodiment of the present disclosure. As shown in FIG. 6B, the first touch line 11 includes a trace portion 111 and protrusions 112. The protrusions 112 protrude toward a same side of the trace portion 111. The protrusions 112 come in contact and connection with the same electrode portion 40. In the implementation, two electrode portions 40 at two sides of the first touch line 11 are electrically connected through the bridging portion 50.

Figure 6C:
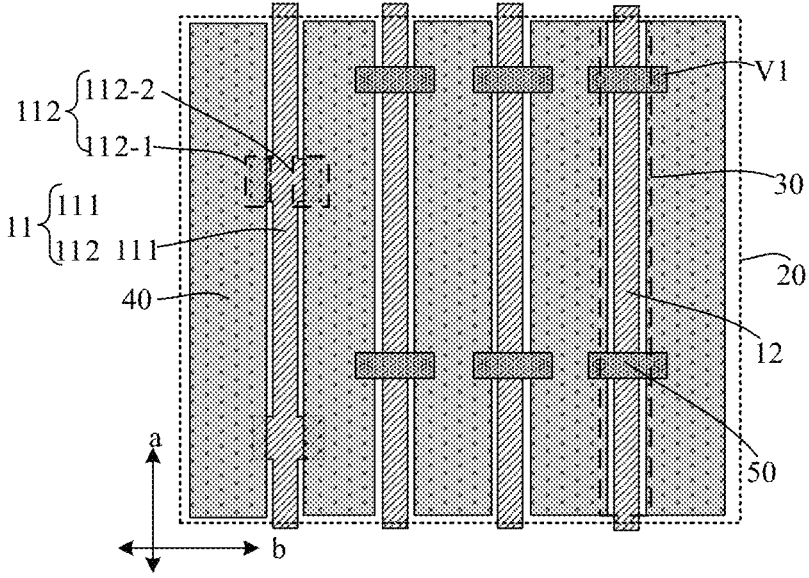
FIG. 6C is a partial schematic view of a display panel according to an embodiment of the present disclosure.

In some other implementations, FIG. 6C is a partial schematic view of another display panel according to an embodiment of the present disclosure. As shown in FIG. 6C, the first touch line 11 includes a trace portion 111 and protrusions 112. At least one of the protrusions 112 (such as the protrusion 112-1) protrudes toward a left side of the trace portion 111, and is in contact and connection with one electrode portion 40. At least one of the protrusions 112 (such as the protrusion 112-2) protrudes toward a right side of the trace portion 111, and is in contact and connection with another electrode portion 40. In the implementation, two electrode portions 40 at two sides of the first touch line 11 are electrically connected through the first touch line 11. The bridging portion 50 may not be provided between the two electrode portions 40.

In some implementations, the touch electrode 20 includes n electrode portions 40 arranged in the second direction b, n being an integer, and n≥3. FIG. 3 takes n=5 as an example. As shown in FIG. 3, in two adjacent touch electrodes 20 in the first direction a, adjacent electrode portions 40 in the first direction a have a same first width $D_1$. The first width $D_1$ refers to a width of the electrode portion 40 along the second direction b. According to the present disclosure, the touch electrode 20 is separated by the hollow 30. The touch line 10 extends along the first direction a. A plurality of touch electrodes 20 are arranged into columns in the first direction a. In the implementation, adjacent touch electrodes 20 in the first direction a have a same shape, which meets a wiring requirement of the touch line 10.

Further, as shown in FIG. 6A, in the touch electrode 20, the first width $D_1$ of each electrode portion 40 is the same. In this way, each electrode portion 40 in the touch electrode 20 has an approximately same size, and each electrode portion 40 has basically same electrical performance, thereby improving an accuracy of touch detection. Meanwhile, this can further meet the wiring requirement of the touch line 10, and makes the touch line 10 arranged regularly along the second direction b.

Figure 7:
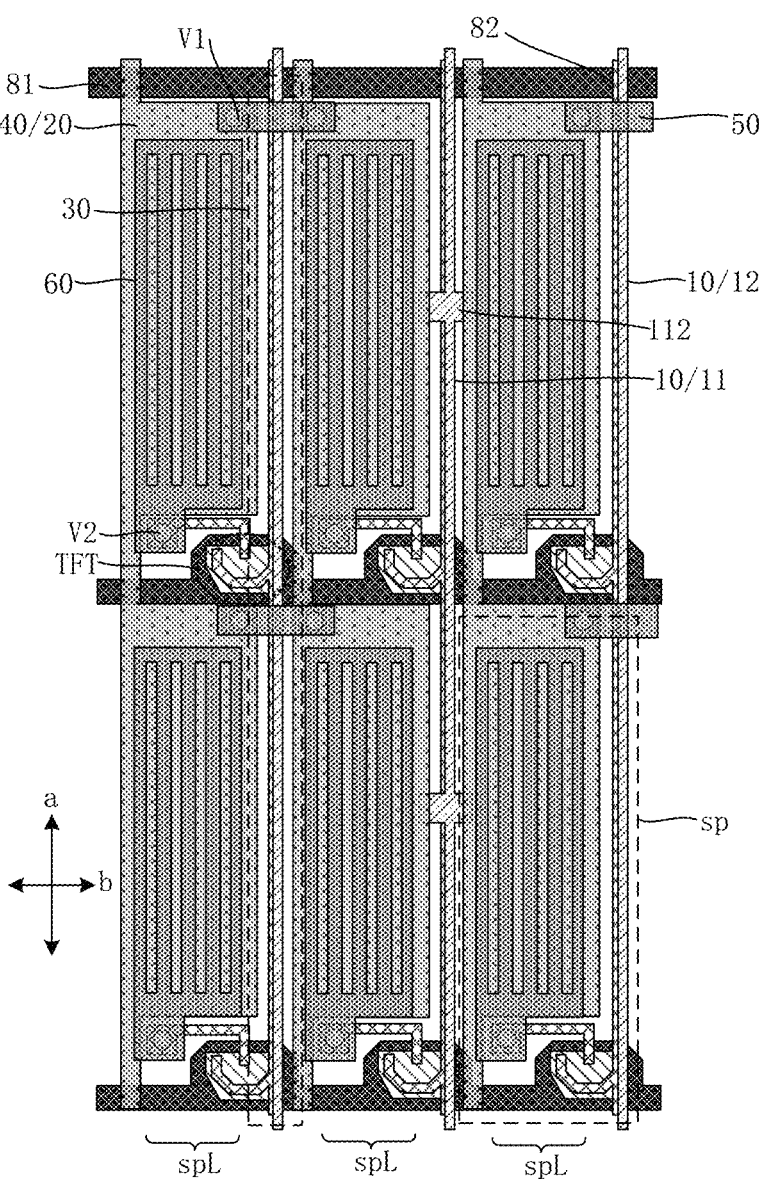
FIG. 7 is a partial schematic view of another display panel according to an embodiment of the present disclosure.
Figure 8:
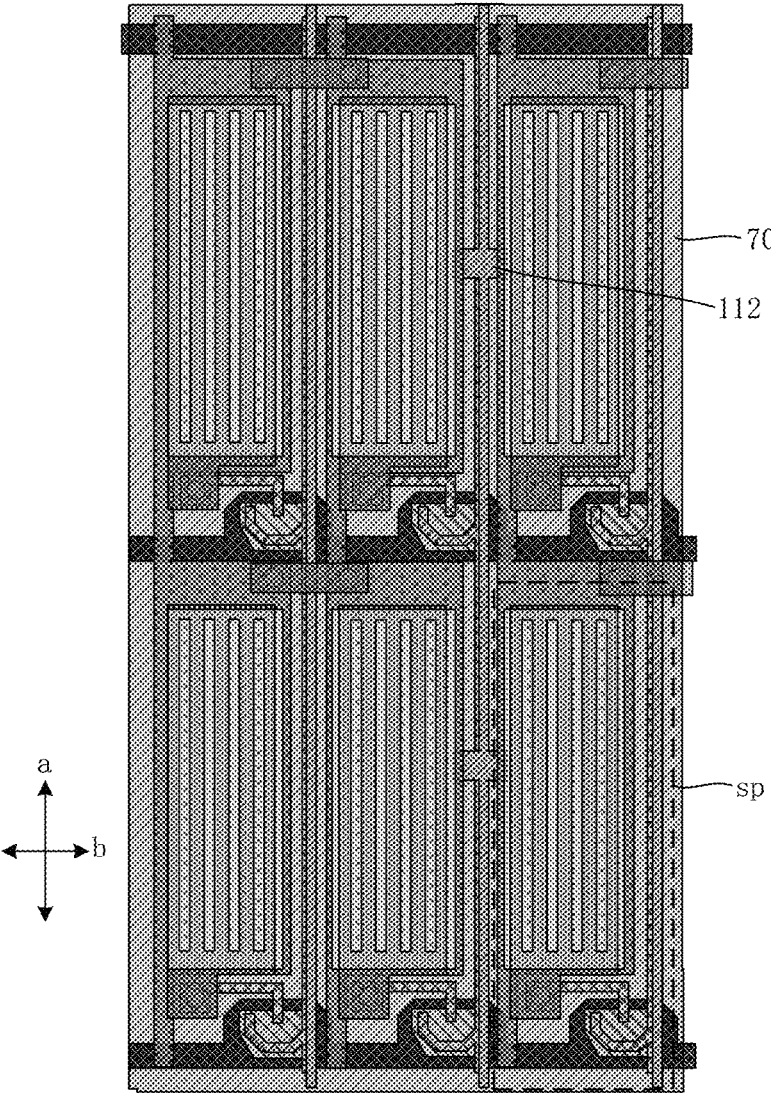
FIG. 8 is a partial schematic view of another display panel according to an embodiment of the present disclosure.

In some implementations, FIG. 7 is a partial schematic view of another display panel according to an embodiment of the present disclosure. FIG. 8 is a partial schematic view of another display panel according to an embodiment of the present disclosure. FIG. 7 illustrates a partial position of the touch electrode 20. FIG. 8 and FIG. 7 illustrate the same position, with the difference that FIG. 8 further illustrates a shading structure. The shading structure defines an opening region of the sub-pixel. The shading structure is the BM on the counter base plate. As shown in FIG. 7, the display panel includes a plurality of sub-pixels sp. The sub-pixels sp each include a pixel electrode 60. As can be seen, the pixel electrode 60 includes a slit. The display panel further includes a scanning line 81 and a data line 82 having extension directions intersecting with each other. A gate of a switching transistor TFT of the sub-pixel sp is electrically connected to the scanning line 81, a source of the switching transistor TFT is connected to the data line 82, and a drain of the switching transistor TFT is connected to the pixel electrode 60 through second via holes V2. As can be seen, the touch electrode 20 is provided with a hollow at the position of the second via hole V2, such that the second via hole V2 can penetrate through a film layer of the touch electrode 20. The bridging portion 50 is connected to the electrode portion 40 through a first via hole V1. As can be seen from FIG. 8, the shading structure 70 defines the opening region (not shown in FIG. 8) of the sub-pixel sp. Alternatively, opening regions of the plurality of sub-pixels sp are spaced by the shading structure 70. FIG. 8 illustrates a top view of the display panel. As can be seen from the top view, along the direction perpendicular to the plane of the substrate 00, the protrusion 112 overlaps with the shading structure 70. In display, a voltage difference between the pixel electrode 60 and the touch electrode 20 forms an electric field, thereby controlling deflection of LC molecules, and realizing display of the sub-pixel sp. Since the protrusion 112 is in contact and connection with the electrode portion 40, a rough lapped position between the protrusion and the electrode portion may make LC molecules at corresponding positions of the protrusion 112 deflected irregularly to affect the display. In the implementation, the shading structure 70 overlaps with the protrusion 112, such that abnormal light from the protrusion 112 can be obstructed and does not affect the display of the sub-pixel sp.

In addition, from FIG. 7 and FIG. 8, along the direction perpendicular to the plane of the substrate 00, a projection of the shading structure 70 on a plane of the bridging portion 50 covers the bridging portion 50. That is, the shading structure 70 covers the first via hole V1. In this way, the display of the sub-pixel sp can be prevented from being affected by disturbance in the deflection of the LC molecules at the position of the bridging portion 50.

From FIG. 7 and FIG. 8, the display panel includes a plurality of sub-pixels sp. The bridging portion 50 is electrically connected to the electrode portion 40 through the first via hole V1. The shading structure 70 provided covers the bridging portion 50 and the first via hole V1, which will affect an area of the opening region of the sub-pixel sp to some extent. The plurality of sub-pixels sp in the display panel include a blue sub-pixel, a red sub-pixel, and a green sub-pixel. The three color sub-pixels form a pixel unit. The pixel unit can emit white light. In the embodiment of the present disclosure, at least a part of the first via hole V1 is located at the blue sub-pixel, which affects the area of the opening region of the blue sub-pixel to reduce a transmittance and a luminance of the blue sub-pixel. However, in response to the white light mixed by the light of the three color sub-pixels, a luminance of blue light takes a smallest proportion, and the reduced transmittance of the blue sub-pixel has little influence on the display.

In some implementations, as shown in FIG. 8, the sub-pixels sp include an opening region. At least a part of the first via hole V1 is adjacent to a corner of the opening region. That is, the bridging portion 50 and the first via hole V1 are provided close to the scanning line 81 or the switching transistor TFT. Since the bridging portion 50 and the pixel electrode 60 are located on the same layer and made of the same material, the bridging portion 50 needs to avoid the pixel electrode 60, so as to ensure the uniform pattern of the pixel electrode 60. In a region of the sub-pixel sp provided with the first via hole V1, the opening region of the sub-pixel sp may be a rectangle, as shown in FIG. 8. In some implementations, since the shading structure obstructs the first via hole V1, the opening region of the sub-pixel sp deforms to some extent on the basis of the rectangle. In the implementation, since the bridging portion 50 and the first via hole V1 are provided at the corner of the opening region of the sub-pixel sp, the bridging portion 50 and the first via hole V1 have little influence on the shape of the opening region.

Figure 9:
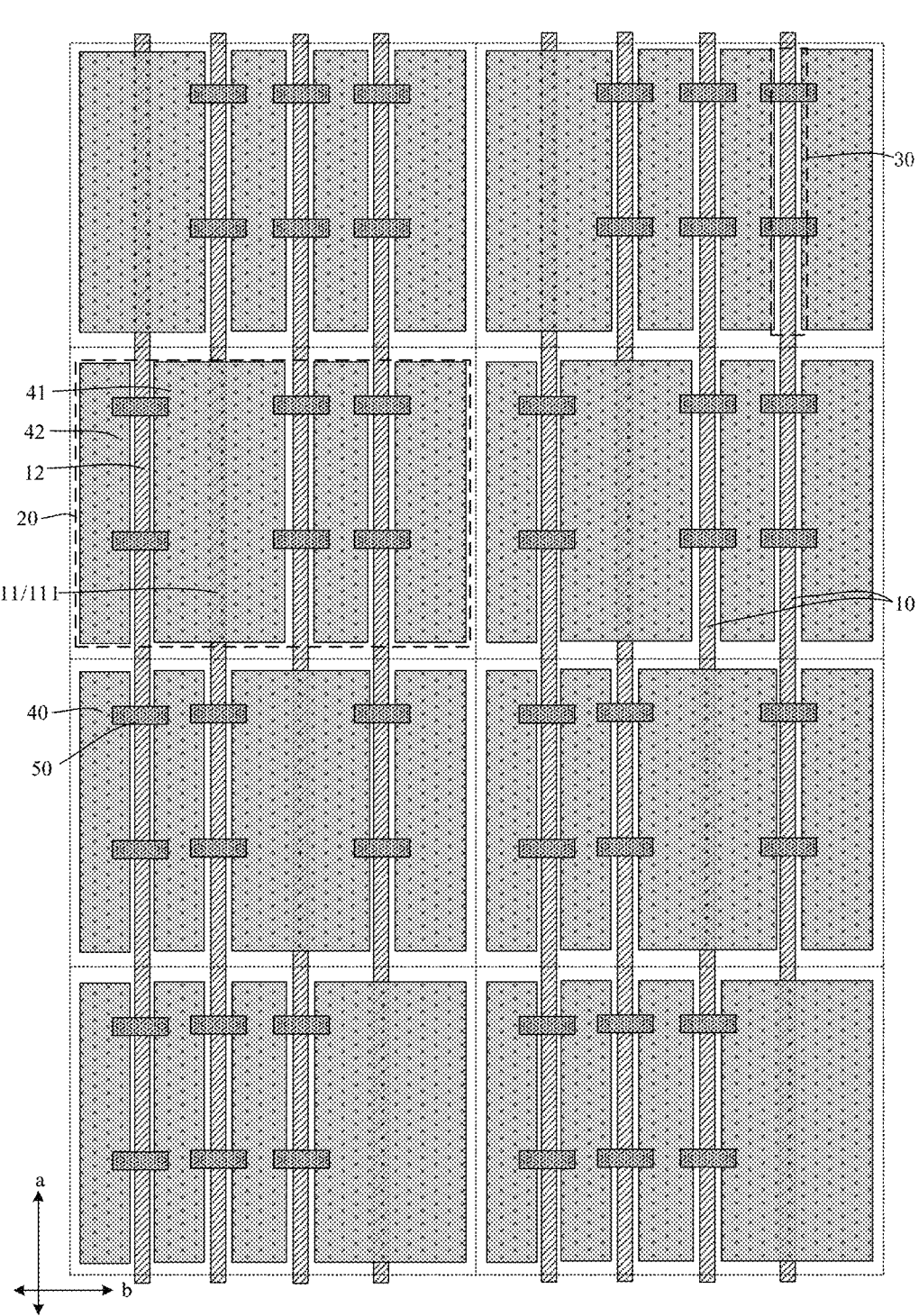
FIG. 9 is a schematic view of another display panel according to an embodiment of the present disclosure.

In some other implementations, FIG. 9 is a schematic view of another display panel according to an embodiment of the present disclosure. FIG. 9 illustrates eight touch electrodes 20 at four rows and two columns. In the region of one touch electrode 20, the first touch line 11 includes a trace portion 111 extending along the first direction a. Along the direction perpendicular to the plane of the substrate 00, the trace portion 111 overlaps and contacts with at least a part of the electrode portions 40. The second touch line 12 overlaps with the hollow 30, and does not overlap with the electrode portion 40. The shape of the touch electrode 20 in FIG. 9 is shown for the purpose of illustration only. It can be understood that in a solution in which the touch electrode 20 can be multiplexed as the common electrode, the pixel electrode needs to pass through a film layer of the touch electrode 20 and is connected to the switching transistor under the touch electrode 20. Hence, a hollow region is required to be formed in the touch electrode 20 to allow a via hole between the pixel electrode and the switching transistor to pass through.

In the implementation, the touch electrode 20 is not provided with the hollow at the first touch line 11, such that the first touch line 11 overlaps and contacts with the touch electrode 20. Consequently, a contact area between the first touch line and the touch electrode is large enough to reduce a contact impedance. Moreover, in the implementation, the total area of the hollow on the touch electrode 20 can be reduced, and the overall resistance of the touch electrode 20 is small, thereby facilitating signal transmission on the touch electrode 20.

As shown in FIG. 9, in the touch electrode 20, the electrode portions 40 include a first electrode portion 41 and a second electrode portion 42. Along the second direction b, a width of the first electrode portion 41 is greater than a width of the second electrode portion 42. The trace portion 111 overlaps and contacts with the first electrode portion 41. In the implementation, the touch electrode 20 includes the electrode portions 20 having different widths, such that the touch lines 10 can be arranged regularly in the second direction b.

Figure 10:
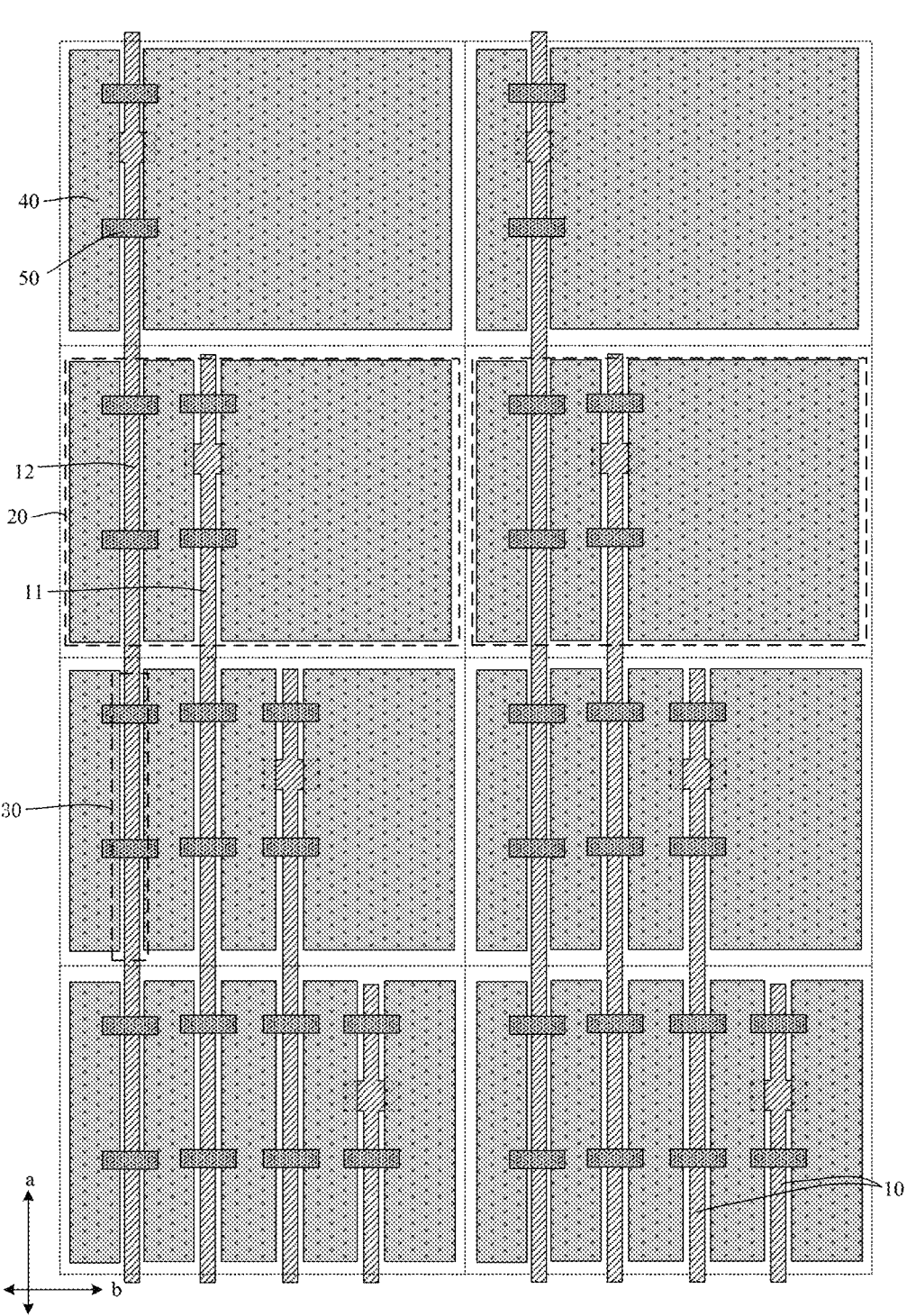
FIG. 10 is a schematic view of another display panel according to an embodiment of the present disclosure.

In some other implementations, FIG. 10 is a schematic view of another display panel according to an embodiment of the present disclosure. As shown in FIG. 10, at the position of the touch electrode 20, the first touch line 11 is in contact and connection with the touch electrode 20, and stops at the touch electrode 20. In the implementation, the touch lines 10 in the display panel have different lengths. In the first direction a, the touch electrodes 20 have different shapes, and include different numbers of electrode portions 40.

In some implementations, as shown in FIG. 7, the display panel includes a scanning line 81 extending along the second direction b. The bridging portion 50 extends along the second direction b. The bridging portion 50 is connected to two adjacent electrode portions 40 through at least two first via holes V1. The at least two first via holes V1 are respectively located at positions of two adjacent sub-pixels sp in the second direction b. As can be seen from FIG. 7, the plurality of sub-pixels sp are arranged into sub-pixel columns spL in the first direction a. The hollow 30 for cutting off the touch electrode 20 is located between adjacent sub-pixel columns. In this way, the hollow 30 does not overlap with the opening region of the sub-pixel sp, ensuring that the touch electrode 20 covers the entire opening region of the sub-pixel sp. When the touch electrode 20 is multiplexed as the common electrode, the display is prevented from being affected by disturbance in the deflection of the LC molecules in the opening of the sub-pixel sp.

As shown in FIG. 7, the plurality of sub-pixels are arranged into the sub-pixel columns spL along the first direction a. The touch line 10 is located between adjacent sub-pixel columns spL. The touch line 10 is made of a metal material. The touch line 10 between adjacent sub-pixel columns spL can be covered by the shading structure 70, so as to prevent the touch line 10 from reflecting environmental light to affect a display effect.

In addition, as can be seen from FIG. 7, the data line 82 extends along the first direction a. In some implementations, along the direction perpendicular to the plane of the substrate 00, the touch line 10 overlaps with at least a part of the data line 82, and the shading structure 70 overlaps with the data line 82 and the touch line 10. Since the touch line 10 overlaps with at least a part of the data line 82, a total width occupied by a metal line between the sub-pixels sp can be reduced, so as not to affect the size of the opening region of the sub-pixel sp, and ensure an opening ratio of the sub-pixel sp.

Figure 11:
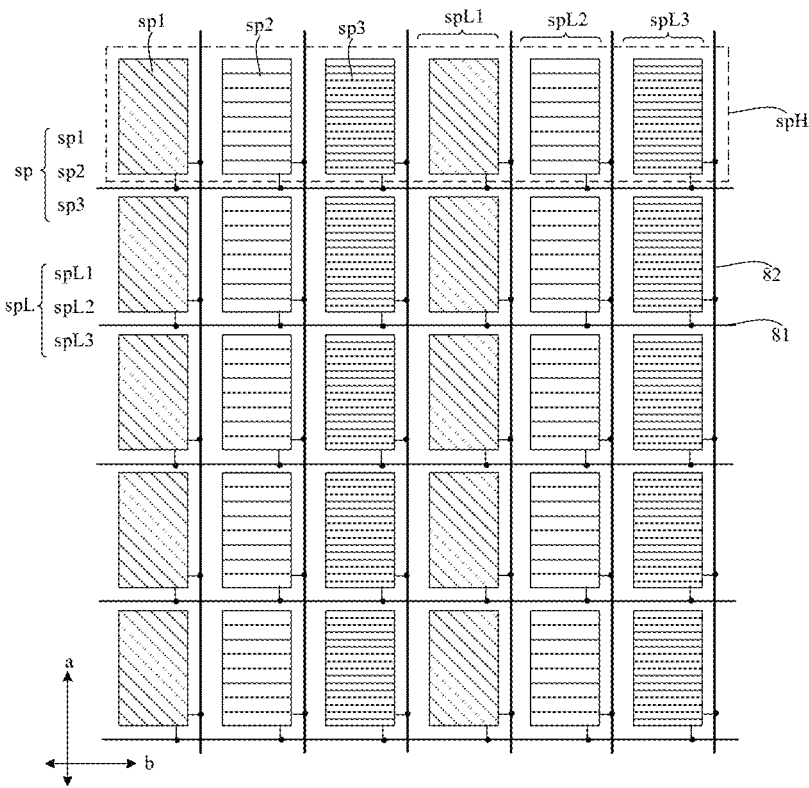
FIG. 11 is a schematic view of another display panel according to an embodiment of the present disclosure.

In some implementations, FIG. 11 is a schematic view of another display panel according to an embodiment of the present disclosure. FIG. 11 illustrates an arrangement of the sub-pixels sp, as well as an arrangement of the data line 82 and the scanning line 81 in the display panel. As shown in FIG. 11, the plurality of sub-pixels sp include a first sub-pixel sp1, a second sub-pixel sp2, and a third sub-pixel sp3 in different colors. The sub-pixel columns spL include a first sub-pixel column spL1, a second sub-pixel column spL2, and a third sub-pixel column spL3. The first sub-pixel column spL1 includes a plurality of first sub-pixels sp1. The second sub-pixel column spL2 includes a plurality of second sub-pixels sp2. The third sub-pixel column spL3 includes a plurality of third sub-pixels sp3. The display panel includes data lines 82 extending along the first direction a. One sub-pixel column spL is connected to one data line 82. The first sub-pixel sp1, the second sub-pixels sp2 and the third sub-pixels sp3 are arranged alternately into sub-pixel rows spH in the second direction b. The display panel includes scanning lines 81 extending along the second direction b. One scanning line 81 is connected to a plurality of sub-pixels sp in one sub-pixel row spH.

Figure 12:
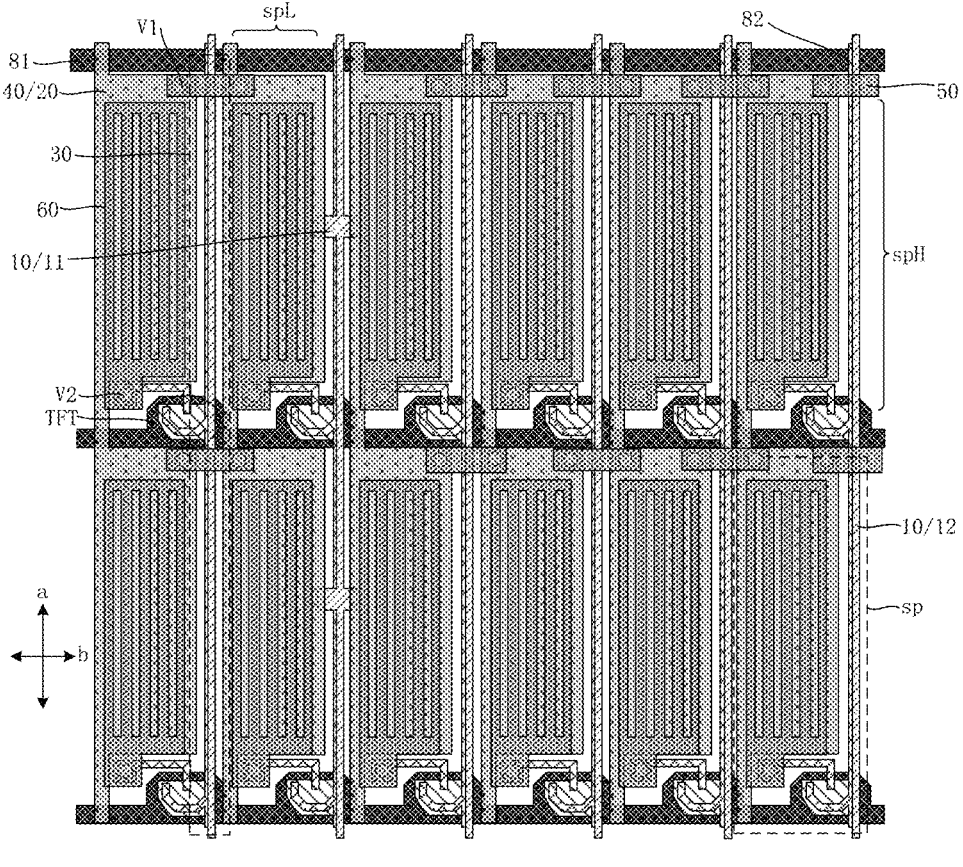
FIG. 12 is a partial circuit layout of the display panel provided by the embodiment of FIG. 11.

FIG. 12 is a partial circuit layout of the display panel provided by the embodiment of FIG. 11. FIG. 12 schematically illustrates the position of one touch electrode 20. As shown in FIG. 12, the touch line 10 is located between adjacent sub-pixel columns spL. The first touch line 11 is in contact and connection with the touch electrode 40. Along the direction perpendicular to the plane of the substrate 00, the second touch line 12 overlaps with the hollow 30, and does not overlap with the electrode portion 40. As can be seen from FIG. 12, the touch line 10 overlaps with at least a part of the data line 82. This can reduce a total width occupied by a metal line between the sub-pixels sp, and can ensure an opening ratio of the sub-pixel sp.

In some implementations, along the direction perpendicular to the plane of the substrate 00, the electrode portion 40 overlaps with m sub-pixel columns, m being an integer, and m≥1. While the touch electrode 20 and the sub-pixel sp have a determined size, the greater the m, the fewer the number of hollows 30 on the touch electrode 20, thereby reducing a resistance of the touch electrode 20 accordingly. The design of the hollow 30 further needs to meet the wiring requirement of the touch line 10. The touch line 10 overlaps with at least a part of the data line 82. Preferably, each data line 82 is correspondingly provided with one touch line 10, such that each signal line can have a same parasitic capacitance. As shown in FIG. 12, each electrode portion 40 in the touch electrode 20 overlaps with one sub-pixel column spL. Along the direction perpendicular to the plane of the substrate 00, the touch line 10 overlaps with at least a part of the data line 82. In this way, the touch electrode 20 can be separated uniformly by the hollow 30, the hollow 30 does not overlap with the opening region of the sub-pixel sp, ensuring that the touch electrode 20 covers the entire opening region of the sub-pixel sp. Moreover, the touch line 10 can be provided between adjacent sub-pixel columns spL, and overlap with the data line 82, thereby ensuring the same parasitic capacitance on each signal line.

Figure 13:
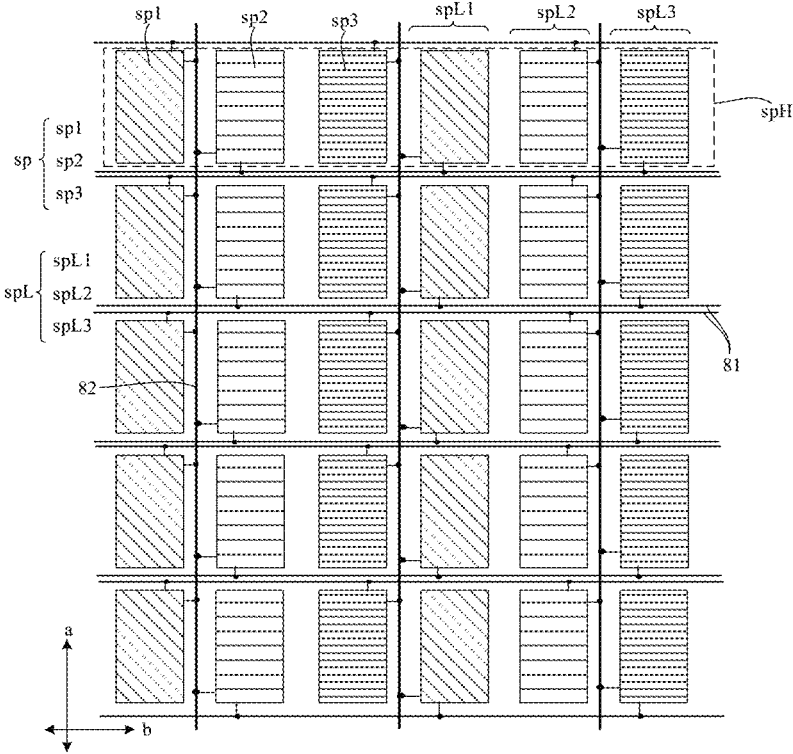
FIG. 13 is a schematic view of another display panel according to an embodiment of the present disclosure.

In some other implementations, FIG. 13 is a schematic view of another display panel according to an embodiment of the present disclosure. As shown in FIG. 13, the plurality of sub-pixels sp include a first sub-pixel sp1, a second sub-pixel sp2, and a third sub-pixel sp3 in different colors. The sub-pixel columns spL include a first sub-pixel column spL1, a second sub-pixel column spL2, and a third sub-pixel column spL3. The first sub-pixel column spL1 includes a plurality of first sub-pixels sp1. The second sub-pixel column spL2 includes a plurality of second sub-pixels sp2. The third sub-pixel column spL3 includes a plurality of third sub-pixels sp3. The first sub-pixel column spL1, the second sub-pixel column spL2 and the third sub-pixel column spL3 are arranged alternately in the second direction b. The display panel includes data lines 82 extending along the first direction a. Two adjacent sub-pixel columns spL are connected to a same data line 82. The first sub-pixels sp1, the second sub-pixels sp2 and the third sub-pixels sp3 are arranged alternately into sub-pixel rows spH in the second direction b. The display panel includes scanning lines 81 extending along the second direction b. One sub-pixel row spH is connected to two scanning lines 81. An odd-numbered sub-pixel sp in the sub-pixel row spH is connected to one scanning line 81. An even-numbered sub-pixel sp in the sub-pixel row spH is connected to another scanning line 81.

Figure 14:
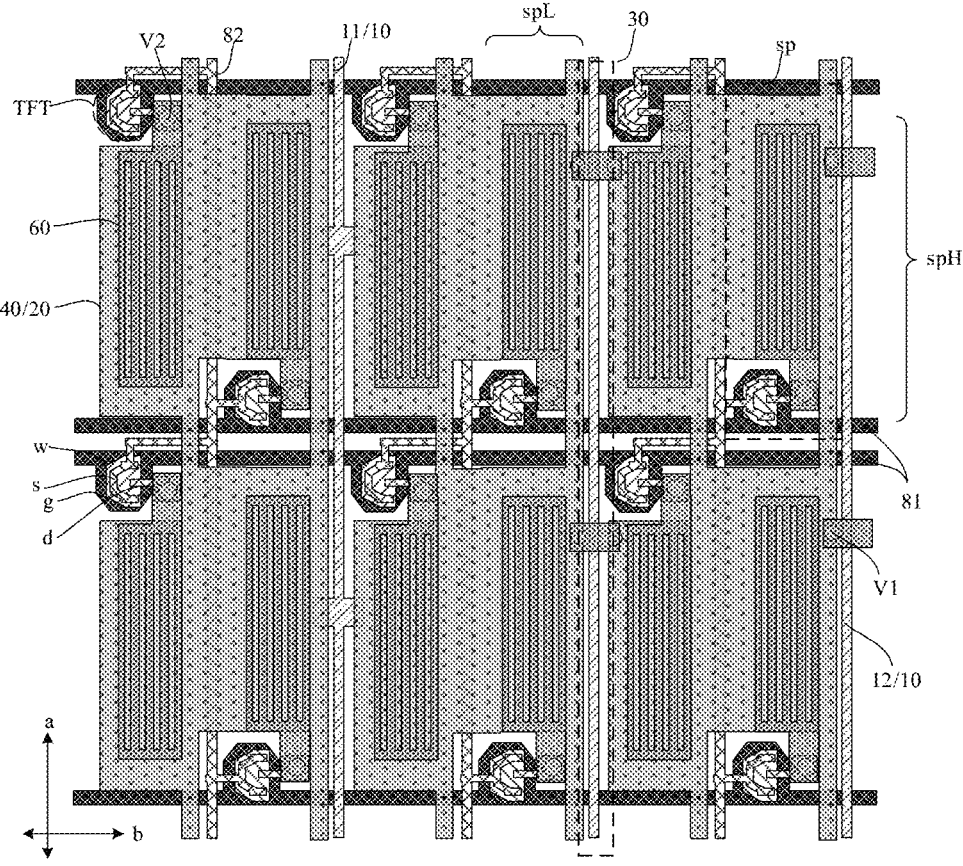
FIG. 14 is a partial circuit layout of the display panel provided by the embodiment of FIG. 13.

FIG. 14 is a partial circuit layout of the display panel provided by the embodiment of FIG. 13. FIG. 14 schematically illustrates the position of one touch electrode 20. As shown in FIG. 14, the touch line 10 is located between adjacent sub-pixel columns spL. The first touch line 11 is in contact and connection with the touch electrode 40. Along the direction perpendicular to the plane of the substrate 00, the second touch line 12 overlaps with the hollow 30, and does not overlap with the electrode portion 40. FIG. 14 further schematically illustrates the active layer w, the gate g, the source s, and the drain d of the switching transistor TFT. The switching transistor TFT in FIG. 12 and FIG. 16 can be understood with reference to FIG. 14.

As shown in FIG. 14, the data line 82 is located between two adjacent sub-pixel columns spL. Adjacent data line 82 and touch line 10 are at least spaced by one sub-pixel column spL. FIG. 14 takes a case where each electrode portion 40 in the touch electrode 20 overlaps with two sub-pixel columns spL, namely m=2 as an example. In the implementation, the touch line 10 and the data line 82 are spaced by a column. Along the direction perpendicular to the plane of the substrate 00, the touch line 10 does not overlap with the data line 82, such that a coupling capacitance between the touch line and the data line can be reduced.

Figure 15:
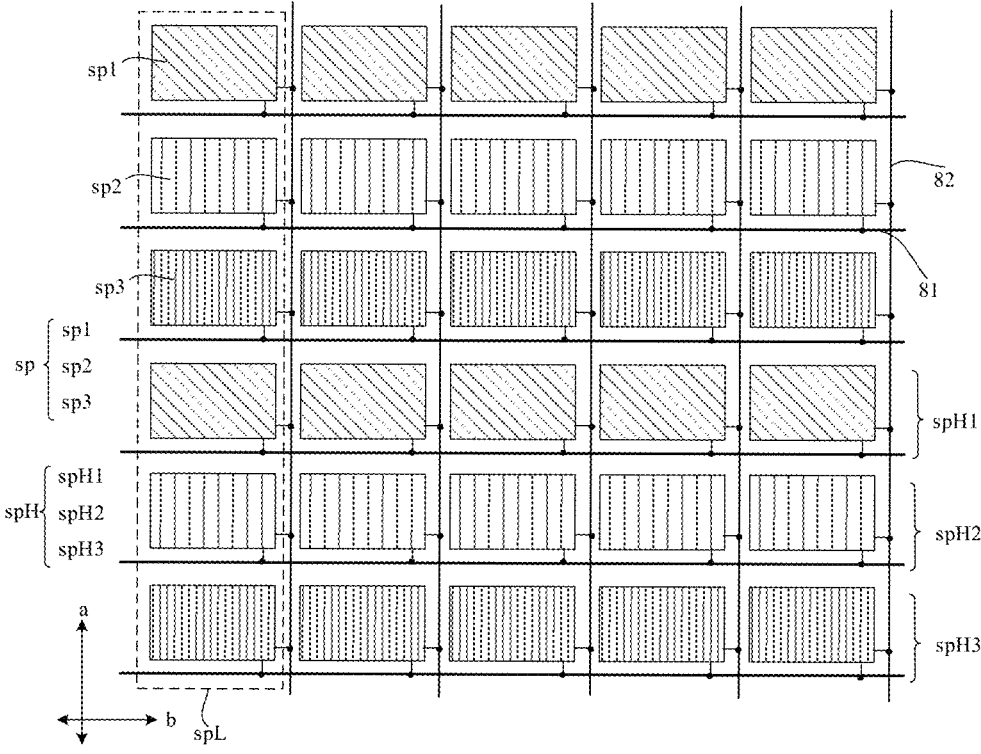
FIG. 15 is a schematic view of another display panel according to an embodiment of the present disclosure.

In some other implementations, FIG. 15 is a schematic view of another display panel according to an embodiment of the present disclosure. As shown in FIG. 15, the plurality of sub-pixels sp include a first sub-pixel sp1, a second sub-pixel sp2, and a third sub-pixel sp3 in different colors. The first sub-pixel sp1, the second sub-pixel sp2 and the third sub-pixel sp3 are arranged alternately into sub-pixel columns spL in the first direction a. The display panel includes data lines 82 extending along the first direction a. One sub-pixel column spL is connected to one data line 82. The plurality of sub-pixels sp are arranged into sub-pixel rows spH along the second direction b. The sub-pixel rows spH include a first sub-pixel row spH1, a second sub-pixel row spH2, and a third sub-pixel row spH3. The first sub-pixel row spH1 includes a plurality of first sub-pixels sp1. The second sub-pixel row spH2 includes a plurality of second sub-pixels sp2. The third sub-pixel row spH3 includes a plurality of third sub-pixels sp3. The display panel includes scanning lines 81 extending along the second direction b. One scanning line 81 is connected to a plurality of sub-pixels sp in one sub-pixel row spH.

Figure 16:
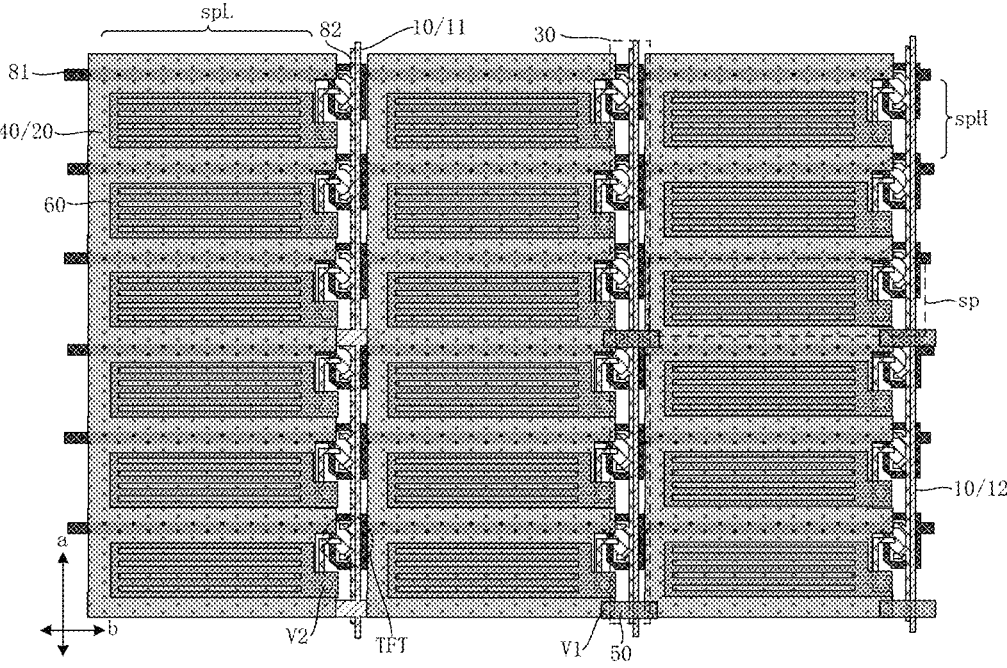
FIG. 16 is a partial circuit layout of the display panel provided by the embodiment of FIG. 15.

FIG. 16 is a partial circuit layout of the display panel provided by the embodiment of FIG. 15. FIG. 16 schematically illustrates the position of one touch electrode 20. As shown in FIG. 16, the touch line 10 is located between adjacent sub-pixel columns spL. The first touch line 11 is in contact and connection with the electrode portion 40. Along the direction perpendicular to the plane of the substrate 00, the second touch line 12 overlaps with the hollow 30, and does not overlap with the electrode portion 40. The touch line 10 overlaps with at least a part of the data line 82. With reference to FIG. 15, the third sub-pixels sp3 of the implementation are arranged into the third sub-pixel row spH3 along the second direction b, and the bridging portion 50 may be provided at a position of the third sub-pixel sp3. It can be understood that a region defined by the crisscrossed data line 82 and the scanning line 81 is a region of the sub-pixels sp. Optionally, the third sub-pixel sp3 is a blue sub-pixel. The bridging portion 50 will affect an opening ratio of the blue sub-pixel, such that a transmittance of the blue sub-pixel is reduced. In response to the white light mixed by the light of the three types of sub-pixels, a luminance of blue light takes a smallest proportion, and the reduced transmittance of the blue sub-pixel has little influence on the display.

Figure 17:
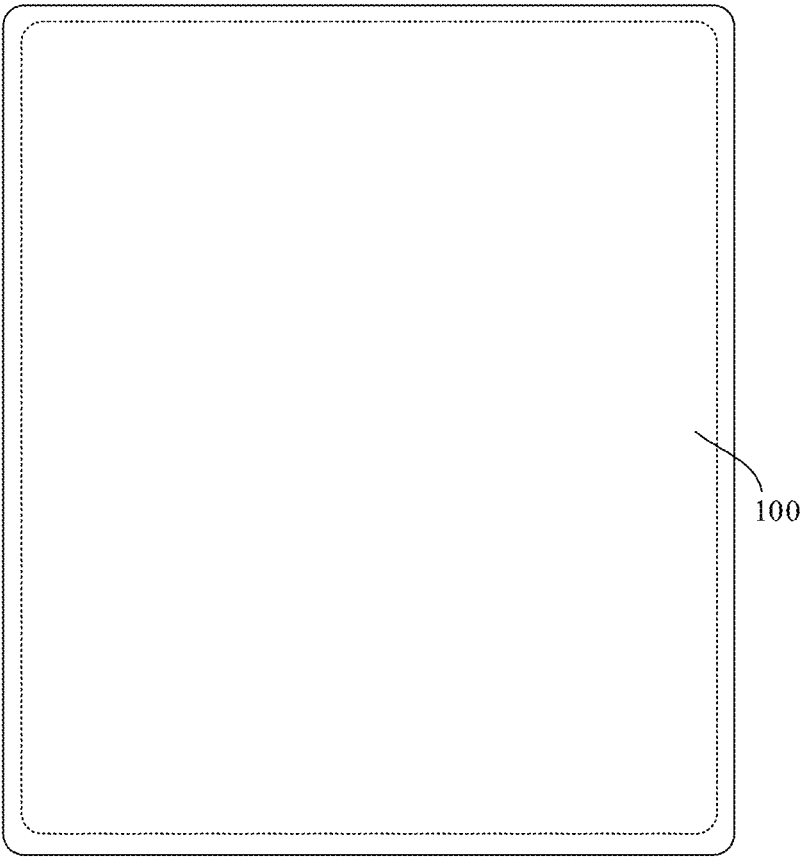
FIG. 17 is a schematic view of a display apparatus according to an embodiment of the present disclosure.

Based on a same inventive concept, an embodiment of the present disclosure further provides a display apparatus. FIG. 17 is a schematic view of a display apparatus according to an embodiment of the present disclosure. As shown in FIG. 17, the display apparatus includes the display panel 100 provided in any embodiment of the present disclosure. The structure of the display panel 100 has been described in the foregoing embodiments, and details are not described herein again. The display apparatus provided by the embodiment of the present disclosure may be an electronic device such as a mobile phone, a tablet computer, a television, a computer, a car monitor, and an intelligent wearable product.

The above descriptions are merely preferred embodiments of the present disclosure, and are not intended to limit the present disclosure. Any modifications, equivalent replacements, improvements, and the like made within the spirit and principle of the present disclosure shall fall within the protection scope of the present disclosure.

Finally, it should be noted that the foregoing embodiments are merely intended to describe and not to limit the technical solutions of the present disclosure. Although the present disclosure has been described in detail with reference to the foregoing embodiments, those skilled in the art should understand that they can still make modifications to the technical solutions described in the foregoing embodiments or make equivalent replacements to some or all of the technical features thereof. These modifications or replacements do not make the essence of the corresponding technical solutions deviate from the scope of the technical solutions of the embodiments of the present disclosure.

What is claimed is:

1. A display panel, comprising a substrate, and a plurality of touch lines and a plurality of touch electrodes located at one side of the substrate, wherein one touch electrode of the plurality of touch electrodes is electrically connected to at least one touch line of the plurality of touch lines;

each touch electrode comprises at least one hollow extending along a first direction; each touch electrode is isolated by the at least one hollow in a second direction; the second direction intersects with the first direction; and each touch electrode comprises electrode portions respectively located at two sides of the hollow;

the touch lines comprise a first touch line and a second touch line; and in a region of one touch electrode, at least a part of the first touch line is in contact and electrical connection with the one touch electrode; along a direction perpendicular to a plane of the substrate, the second touch line overlaps with one hollow; and electrode portions at least located at two sides of the second touch line are electrically connected through a bridging portion, wherein the display panel comprises a plurality of sub-pixels; the plurality of sub-pixels are arranged into sub-pixel columns along the first direction; and the touch line is located between two adjacent sub-pixel columns.

2. The display panel according to claim 1, wherein the first touch line comprises a trace portion and at least one protrusion; the trace portion extends along the first direction; the protrusion is connected to the trace portion, and protrudes along the second direction; and along the direction perpendicular to the plane of the substrate, the trace portion overlaps with another hollow, and at least a part of the protrusion overlaps and contacts with the electrode portion located on at least one side of the first touch line.

3. The display panel according to claim 2, wherein each touch electrode comprises n electrode portions arranged along the second direction, n being an integer, and n≥3; and in two adjacent touch electrodes in the first direction, adjacent electrode portions in the first direction have a same first width; and the first width refers to a width of an electrode portion along the second direction.

4. The display panel according to claim 2, wherein the display panel comprises a plurality of sub-pixels; and the sub-pixels each comprise an opening region; and the display panel further comprises a shading structure for spacing a plurality of opening regions; and along the direction perpendicular to the plane of the substrate, the protrusion overlaps with the shading structure.

5. The display panel according to claim 1, wherein the first touch line comprises a trace portion extending along the first direction; and along the direction perpendicular to the plane of the substrate, the trace portion overlaps and contacts with at least a part of the electrode portions.

6. The display panel according to claim 5, wherein in one touch electrode, the electrode portions comprise a first electrode portion and a second electrode portion; and along the second direction, a width of the first electrode portion is greater than a width of the second electrode portion; and the trace portion overlaps and contacts with the first electrode portion.

7. The display panel according to claim 1, wherein the display panel comprises a plurality of sub-pixels; and the sub-pixels each comprise an opening region; and the display panel further comprises a shading structure for spacing a plurality of opening regions; and along the direction perpendicular to the plane of the substrate, a projection of the shading structure on a plane of the bridging portion covers the bridging portion.

8. The display panel according to claim 1, wherein the bridging portion is electrically connected to the electrode portion located at two sides of the second touch line through first via holes; and the display panel comprises a plurality of sub-pixels; the sub-pixels at least comprise a blue sub-pixel; and at least a part of the first via holes is located at a position of the blue sub-pixel.

9. The display panel according to claim 1, wherein the bridging portion is electrically connected to the electrode portion located at two sides of the second touch line through first via holes;

the display panel comprises a plurality of sub-pixels; and the display panel comprises scanning lines extending along the second direction; the bridging portion extends along the second direction; the bridging portion is connected to two adjacent electrode portions located at two sides of the second touch line through at least two first via holes; and the at least two first via holes are respectively located at positions of two adjacent sub-pixels in the second direction.

10. The display panel according to claim 1, wherein the bridging portion is electrically connected to the electrode portion located at two sides of the second touch line through first via holes; and the display panel comprises a plurality of sub-pixels; the sub-pixels each comprise an opening region; and at least a part of the first via holes is adjacent to a corner of the opening region.

11. The display panel according to claim 1, wherein the display panel comprises a first metal layer and a first transparent conductive layer that are located at the one side of the substrate; and the first transparent conductive layer is located at a side of the first metal layer away from the substrate; and the touch line is located on the first metal layer, and the touch electrode is located on the first transparent conductive layer.

12. The display panel according to claim 11, wherein the display panel comprises a second transparent conductive layer located at the one side of the substrate; and the second transparent conductive layer is located at one side of the first transparent conductive layer away from the substrate; and the display panel comprises a plurality of sub-pixels; the sub-pixels each comprise a pixel electrode; and the pixel electrode and the bridging portion are located on the second transparent conductive layer.

13. The display panel according to claim 1, wherein
the display panel comprises a plurality of sub-pixels; and
   the plurality of sub-pixels are arranged into sub-pixel
   columns along the first direction; and
along the direction perpendicular to the plane of the
   substrate, the electrode portion overlaps with m sub-
   pixel columns, m being an integer, and m≥1.
14. The display panel according to claim 1, wherein
the plurality of sub-pixels comprise a first sub-pixel, a
   second sub-pixel, and a third sub-pixel in different
   colors;
the sub-pixel columns comprise a first sub-pixel column,
   a second sub-pixel column, and a third sub-pixel col-
   umn; the first sub-pixel column comprises a plurality of
   first sub-pixels; the second sub-pixel column comprises
   a plurality of second sub-pixels; the third sub-pixel
   column comprises a plurality of third sub-pixels; the
   display panel comprises data lines extending along the
   first direction; and one sub-pixel column is connected
   to one data line; and
the first sub-pixels, the second sub-pixels and the third
   sub-pixels are arranged alternately into sub-pixel rows
   in the second direction; the display panel comprises
   scanning lines extending along the second direction;
   and one scanning line is connected to a plurality of
   sub-pixels in one sub-pixel row.
15. The display panel according to claim 1, wherein
the plurality of sub-pixels comprise a first sub-pixel, a
   second sub-pixel, and a third sub-pixel in different
   colors;
the sub-pixel columns comprise a first sub-pixel column,
   a second sub-pixel column, and a third sub-pixel col-
   umn; the first sub-pixel column comprises a plurality of
   first sub-pixels; the second sub-pixel column comprises
   a plurality of second sub-pixels; the third sub-pixel
   column comprises a plurality of third sub-pixels; the
   first sub-pixel column, the second sub-pixel column
   and the third sub-pixel column are arranged alternately
   in the second direction; the display panel comprises
   data lines extending along the first direction; and two
   adjacent sub-pixel columns are connected to a same
   data line; and
the first sub-pixels, the second sub-pixels and the third
   sub-pixels are arranged alternately into sub-pixel rows
   in the second direction; the display panel comprises
   scanning lines extending along the second direction;
   one sub-pixel row is connected to two scanning lines;
   an odd-numbered sub-pixel in the sub-pixel row is
   connected to one scanning line; and an even-numbered
   sub-pixel in the sub-pixel row is connected to another
   scanning line.
16. The display panel according to claim 15, wherein
one data line is located between two adjacent sub-pixel
   columns; and adjacent data lines and touch lines are at
   least spaced by one sub-pixel column.
17. The display panel according to claim 1, wherein
the plurality of sub-pixels comprise a first sub-pixel, a
   second sub-pixel, and a third sub-pixel in different
   colors;
the first sub-pixel, the second sub-pixel and the third
   sub-pixel are arranged alternately into the sub-pixel
   columns in the first direction; the display panel com-
   prises data lines extending along the first direction; and
   one sub-pixel column is connected to one data line; and
the plurality of sub-pixels are arranged into sub-pixel
   rows along the second direction; the sub-pixel rows
   comprise a first sub-pixel row, a second sub-pixel row, and a third sub-pixel row; the first sub-pixel row
   comprises a plurality of first sub-pixels; the second
   sub-pixel row comprises a plurality of second sub-
   pixels; the third sub-pixel row comprises a plurality of
   third sub-pixels; the display panel comprises scanning
   lines extending along the second direction; and one
   scanning line is connected to a plurality of sub-pixels in
   one sub-pixel row.
18. The display panel according to claim 17, wherein
the bridging portion is located at a position of the third
   sub-pixel.
19. A display panel, comprising a substrate, and a plurality
of touch lines and a plurality of touch electrodes located at
one side of the substrate, wherein one touch electrode of the
plurality of touch electrodes is electrically connected to at
least one touch line of the plurality of touch lines;
   each touch electrode comprises at least one hollow
      extending along a first direction; each touch electrode
      is isolated by the at least one hollow in a second
      direction; the second direction intersects with the first
      direction; and each touch electrode comprises electrode
      portions respectively located at two sides of the hollow;
   the touch lines comprise a first touch line and a second
      touch line; and
   in a region of one touch electrode, at least a part of the first
      touch line is in contact and electrical connection with
      the one touch electrode; along a direction perpendicular
      to a plane of the substrate, the second touch line
      overlaps with one hollow; and electrode portions at
      least located at two sides of the second touch line are
      electrically connected through a bridging portion,
   wherein the display panel comprises a plurality of sub-
      pixels; and the sub-pixels each comprise an opening
      region; and
   the display panel further comprises a shading structure for
      spacing a plurality of opening regions; and along the
      direction perpendicular to the plane of the substrate, a
      projection of the shading structure on a plane of the
      bridging portion covers the bridging portion.
20. A display panel, comprising a substrate, and a plurality
of touch lines and a plurality of touch electrodes located at
one side of the substrate, wherein one touch electrode of the
plurality of touch electrodes is electrically connected to at
least one touch line of the plurality of touch lines;
   each touch electrode comprises at least one hollow
      extending along a first direction; each touch electrode
      is isolated by the at least one hollow in a second
      direction; the second direction intersects with the first
      direction; and each touch electrode comprises electrode
      portions respectively located at two sides of the hollow;
   the touch lines comprise a first touch line and a second
      touch line; and
   in a region of one touch electrode, at least a part of the first
      touch line is in contact and electrical connection with
      the one touch electrode; along a direction perpendicular
      to a plane of the substrate, the second touch line
      overlaps with one hollow; and electrode portions at
      least located at two sides of the second touch line are
      electrically connected through a bridging portion,
   wherein the first touch line comprises a trace portion and
      at least one protrusion; the trace portion extends along
      the first direction; the protrusion is connected to the
      trace portion, and protrudes along the second direction;
      and along the direction perpendicular to the plane of the
      substrate, the trace portion overlaps with another hol-
      low, and at least a part of the protrusion overlaps and contacts with the electrode portion located on at least one side of the first touch line, wherein the display panel comprises a plurality of sub-pixels; and the sub-pixels each comprise an opening region; and the display panel further comprises a shading structure for spacing a plurality of opening regions; and along the direction perpendicular to the plane of the substrate, the protrusion overlaps with the shading structure.

\* \* \* \* \*